(12) United States Patent
Epp et al.

(10) Patent No.: US 9,008,304 B2
(45) Date of Patent: Apr. 14, 2015

(54) CONTENT PROTECTION KEY MANAGEMENT

(71) Applicant: Intel Corporation, Santa Clara, CA (US)

(72) Inventors: Edward C. Epp, Portland, OR (US); Sachin Agrawal, Hillsboro, OR (US); Michael Bergeron, Portland, OR (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/729,825

(22) Filed: Dec. 28, 2012

(65) Prior Publication Data

US 2014/0189853 A1    Jul. 3, 2014

(51) Int. Cl.
*H04L 9/00* (2006.01)
*G06F 21/31* (2013.01)

(52) U.S. Cl.
CPC ..................................... *G06F 21/31* (2013.01)

(58) Field of Classification Search
CPC ..... H04L 2209/60; H04L 9/08; H04L 9/3247; H04L 9/30
USPC ...................................................... 380/44, 45
See application file for complete search history.

(56) References Cited

U.S. PATENT DOCUMENTS

| 8,229,115 | B2 * | 7/2012 | Pinder | 380/44 |
| 2006/0184796 | A1 * | 8/2006 | Fahrny | 713/176 |
| 2006/0198519 | A9 * | 9/2006 | Candelore | 380/239 |
| 2007/0239605 | A1 * | 10/2007 | Munguia et al. | 705/50 |
| 2009/0323971 | A1 * | 12/2009 | Munguia et al. | 380/284 |
| 2011/0013773 | A1 * | 1/2011 | Pinder | 380/210 |
| 2011/0060919 | A1 * | 3/2011 | Smith et al. | 713/189 |
| 2011/0145577 | A1 * | 6/2011 | Fahrny | 713/168 |
| 2012/0321080 | A1 * | 12/2012 | Candelore et al. | 380/201 |

OTHER PUBLICATIONS

U.S. Appl. No. 13/664,843, filed Oct. 31, 2012.

* cited by examiner

*Primary Examiner* — Teshome Hailu
(74) *Attorney, Agent, or Firm* — Grossman, Tucker, Perreault & Pfleger, PLLC (57) ABSTRACT

This disclosure is directed to content protection key management. In general, devices may include secure processing resources configured to derive content keys (e.g., for use in decrypting secure content) using key ladders. In one embodiment, a device may comprise, for example, at least a secure processing module to derive content keys for use in decrypting secure content. The secure processing module may include, for example, a key ladder storage module and a secure key storage module. The key ladder storage module may be to store at least one key ladder for use in deriving at least one content key. The secure key storage module may be to store the at least one content key derived using the key ladder.

13 Claims, 5 Drawing Sheets

Example Four Tier Key Ladder 302

| Component | Hex offset | Size (bytes) | Description |
|---|---|---|---|
| Key Ladder ID | 0x0 | 4 | ID of the Key Ladder |
| Revision Number | 0x4 | 4 | Current Revision = 0x00000001 |
| Reserved | 0x8 | 8 | Set to zeroes |
| Initialization Vector | 0x10 | 16 | |
| Root Key ID | 0x20 | 4 | ID of the Root Key |
| Number of Tiers | 0x24 | 4 | Number of Tiers in this Key Ladder |
| Tier 1 Encrypt/Decrypt Key Rights | 0x28 | 1 | Encrypt/Decrypt Key Rights |
| Tier 1 Sign/Verify Key Rights | 0x29 | 1 | Sign/Verify Key Rights |
| Tier 2 Encrypt/Decrypt Key Rights | 0x2A | 1 | Encrypt/Decrypt Key Rights |
| Tier 2 Sign/Verify Key Rights | 0x2B | 1 | Sign/Verify Key Rights |
| Tier 3 Encrypt/Decrypt Key Rights | 0x2C | 1 | Encrypt/Decrypt Key Rights |
| Tier 3 Sign/Verify Key Rights | 0x2D | 1 | Sign/Verify Key Rights |
| Tier 4 Encrypt/Decrypt Key Rights | 0x2E | 1 | Encrypt/Decrypt Key Rights |
| Tier 4 Sign/Verify Key Rights | 0x2F | 1 | Sign/Verify Key Rights |
| Reserved | 0x30 | 0 | Reserved bytes to make encrypted section 16 byte aligned. |
| Flash Module Signature | 0x30 | 16 | CMAC signature of the entire Key Ladder Blob (computed over previous 0x30 bytes) generated using chip-specific KAUTH |

Key Ladder Storage Module 106'

Key Ladders 300

FIG. 4

400 At Manufacture – Example Provisioning Key Ladder
- Set key ladder root key
  - sec_drm_provision_root_key
    (DRM key, key id, decrypt keys only property)
  - sec_drm_provision_key_ladder  402
    (Key ladder id, key id, tiers, tier properties)

404 At Run Time – Example Loading Key Ladder and Keys
- sec_drm_load_root_key
  (DRM key)
- sec_drm_load_key_ladder  406
  (Key ladder id)
- sec_drm_derive_key_at_tier  408
  (Key ladder id, tier 1, session 1 key blob)
- sec_drm_derive_key_at_tier
  (Key ladder id, tier 2, machine key blob)
- sec_drm_derive_key_at_tier
  (Key ladder id, tier 3, session 2 key blob)
- sec_drm_derive_key_at_tier
  (Key ladder id, tier 4, content key blob)

CONTENT PROTECTION KEY MANAGEMENT

TECHNICAL FIELD

The present disclosure relates to content protection systems, and more particularly, to systems configured to securely manage content protection key characteristics and derivation.

BACKGROUND

In general, content protection may include various types of security schemes configured to control how, where and to whom content may be presented. Examples of content protection may include digital rights management (DRM) for content downloaded from the Internet and as conditional access (CA) for content provided via a television signal (e.g., through a set-top box). A variety of content protection systems are available. For example, Adobe Access is a content protection system offered by the Adobe System Incorporated, Widevine is DRM solution offered by Google Incorporated, and Marlin is a DRM platform created by an open-standards community initiative called the Marlin Developer Community. While the above example content protection solutions may provide similar functionality, their actual implementation may differ substantially.

For example, even though key handling operations for all of the above content protection solutions may be similar, the key handling operations corresponding to each content protection solution still requires a custom implementation within a security processor in a device to protect root keys of trust along with intermediate and content keys (e.g., control words). Preparation of custom key handling firmware may be expensive because it requires specialized knowledge and validation testing. Moreover, implementing multiple customized firmware modules configured for key handling may open up new attack vectors in a device (e.g., to hackers or others desiring to acquire secret key used in generating runtime keys for accessing protected content), and thus, rigorous review is then required to mitigate the potential security risks. These requirements for custom programming substantially increase the work that goes into releasing new devices, which may increase the time and cost involved in getting new devices into the hands of consumers.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to content protection key management. In general, large systems and/or individual devices may include secure processing resources. The secure processing resources may derive content keys (e.g., for use in decrypting secure content) using key ladders. While implemented in a uniform manner, the key ladders may be usable with a variety of different content protection systems and may identify one or more intermediate keys, along with properties corresponding to the intermediate keys, needed to derive the content keys. The content keys may then be used to decrypt the secure content. Thus, content protection may be implemented in a uniform and secure manner that reduces the need for custom programming.

In one embodiment, a device may comprise, for example, a secure processing module to derive content keys for use in decrypting secure content. The secure processing module may include, for example, a key ladder storage module and a secure key storage module. The key ladder storage module may be to store at least one key ladder for use in deriving at least one content key. The secure key storage module may be to store the at least one content key derived using the key ladder.

The device may also comprise, for example, a key derivation module. The key derivation module may be to derive content keys using at least one intermediate key identified by the at least one key ladder. In this regard, the device may also comprise an intermediate key module to provide intermediate keys to the key derivation module. The device may further include, for example, a general licensing module to request derivation of content keys from the key derivation module based on secure content (e.g., received in the device via physical media, an Internet connection, a television signal, etc.). In one embodiment, the at least one key ladder may be encoded in firmware within the device when the device is manufactured.

In one embodiment, key ladders may comprise at least one property corresponding to an intermediate key identified in the key ladders. The at least one property may describe rights for the at least one identified intermediate key including, for example, at least one of encrypt/decrypt rights or sign/verify rights. In at least one example implementation, a key ladder for deriving a key may comprise tiers identifying each intermediate key needed to derive the key, wherein each tier may include at least one property corresponding to the intermediate key identified in the tier. Multi-tier key ladders may further comprise the identification of a root key and an indication of a number of tiers in the key ladder. An example method corresponding to the derivation of keys in the above device may comprise receiving notification of encrypted secure content in the device, loading a key ladder into the secure processing module in response to the notification, deriving a content key in the secure processing module using the key ladder, and decrypting the encrypted secure content using the content key.

Figure 1:
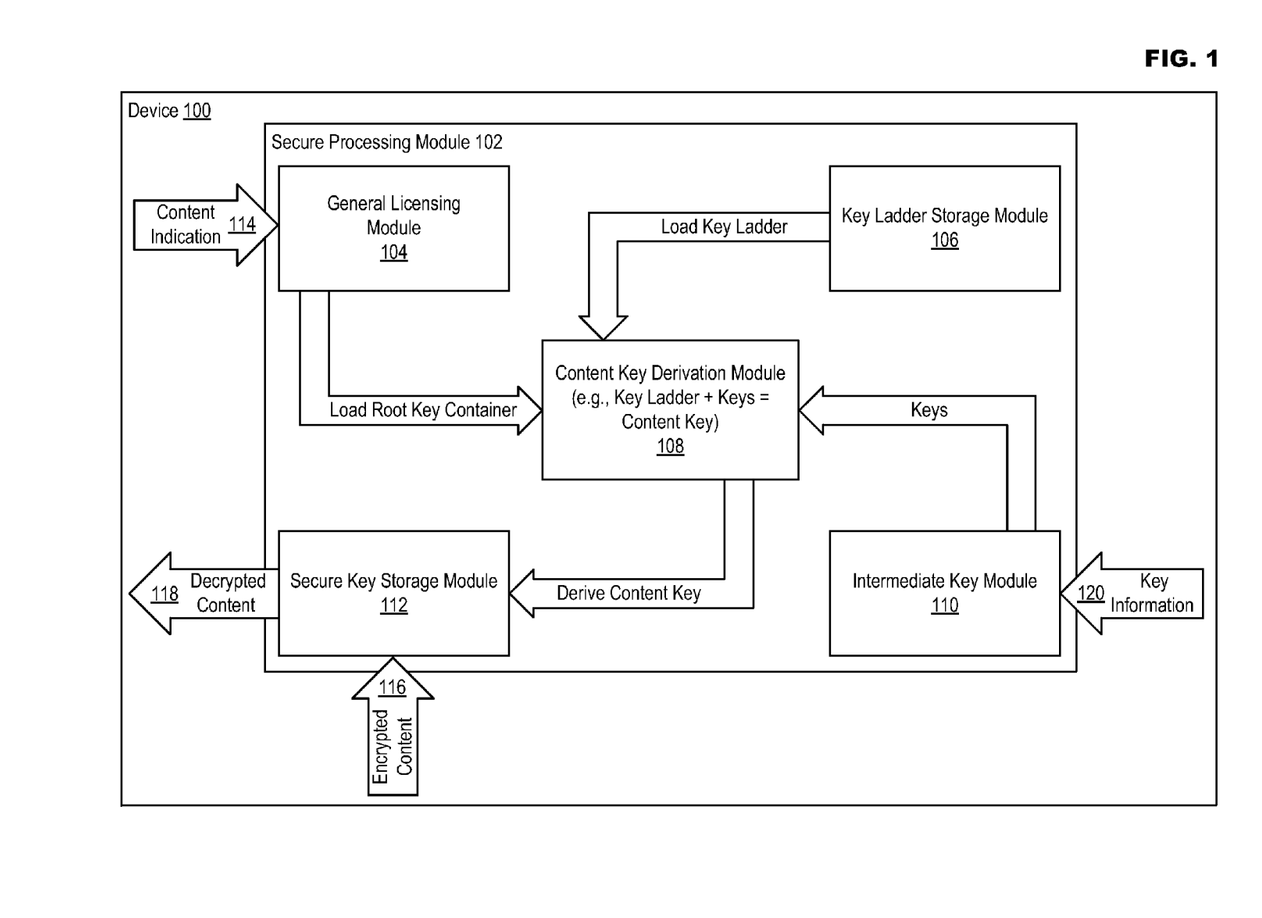
FIG. 1 illustrates an example of content protection key management in accordance with at least one embodiment of the present disclosure.

FIG. 1 illustrates an example of content protection key management in accordance with at least one embodiment of the present disclosure. Examples of device 100 may include, but are not limited to, mobile communication devices such as cellular handsets or smartphones based on the Android® operating system (OS), iOS®, Windows® OS, Blackberry®

OS, Palm® OS, Symbian® OS, etc., mobile computing devices such as tablet computers like an iPad®, Galaxy Tab®, Kindle Fire®, etc., Ultrabooks® including a low-power chipset manufactured by Intel Corporation, netbooks, notebooks, laptops, palmtops, etc., and typically stationary devices such as a desktop computers, servers, devices used with video systems (e.g., "set-top" boxes), etc.

Device 100 may comprise secure processing module 102 to derive and manage content keys for decrypting encrypted content (e.g., to view or present the content). Secure processing module 102 may be, in general, a processing environment to which other programs executing inside or outside device 100 have little or no access. For example, secure processing module 102 may comprise a dedicated security processor in device 100, or alternatively, a processor core (e.g., in a multicore processing device) configured for executing high privilege operations in device 100. Secure processing module 102 may also comprise a separate memory, or portion of memory, that is only accessible to high privilege programs (e.g., programs having ring 1 privilege in terms of a ring protection model). At least some of the modules contained in secure processing module 102 may be loaded from firmware in device 100 (e.g., program code stored in device 100 during manufacture that may be executed at startup and may not be altered).

Secure processing module 102 may comprise, for example, general licensing module 104, key ladder storage module 106, key derivation module 108, intermediate key module 110 and secure key storage module 112. General licensing module 102 may be, for example, firmware to request the derivation of content keys corresponding to indication 114 of encrypted content in device 100. For example, indications 114 may be derived when encrypted content stored in device 100 is opened, or when encrypted content is received into device 100 from a physical medium, the Internet, from a television signal, etc. Key derivation module 108 may be, for example, firmware to derive a content key based on the load request received from general licensing module 104. In response to the load request, key derivation module 108 may load a key ladder from key ladder storage module 106. In one embodiment, key ladders in key ladder storage module 106 may be preloaded into firmware within device 100 during manufacture. Key derivation module 108 may then derive a content key by acquiring and processing any required intermediate keys identified in the key ladder. Required intermediate keys may be provided to key derivation module 108 by intermediate key module 110. For example, intermediate keys may be loaded into intermediate key module 110 at the time the secure content is loaded into device 100, at the time viewing or rendering software related to the content is loaded into device 100, may be obtained from a remote source (e.g., a key server corresponding to the content provider) at the time of presentation, etc. To further enhance security, intermediate keys may be received as key encrypted key information 120 (e.g., signed with the key exchange private key of the content provider) that may not be encrypted until received in intermediate key module 110 to ensure the contents of the intermediate keys are kept secret. Intermediate keys may be used to derive session keys (e.g., content keys having an effective duration only for the length of the communication session over which the secure content is being provided) or more permanent content keys. Content keys derived by key derivation module 108 may be formatted based on now existing or to be developed standards or encryption algorithms including, for example, Abstract Syntax Notation One (ASN.1) Standard, Private Key Information Syntax Standard #8 (PKCS8), Advanced Encryption Standard (AES), RSA algorithm for public-key cryptography, etc.). Key derivation module 108 may also derive keys formatted in accordance with proprietary standards such as, for example, Adobe Access, Widevine, Marlin, etc. Content keys derived by key derivation module 108 may then be stored in secure key storage module 112. In at least one embodiment, encrypted content 116 may be received into secure processing module 102, which may use a content key from secure key storage module 112 to generate decrypted content 118. Performing decryption within secure processing module 102 may, for example, help to protect content keys from being compromised (e.g., from malware in device 100 from obtaining content keys). The resulting decrypted content 118 may then be available for presentation in device 100.

Figure 2:
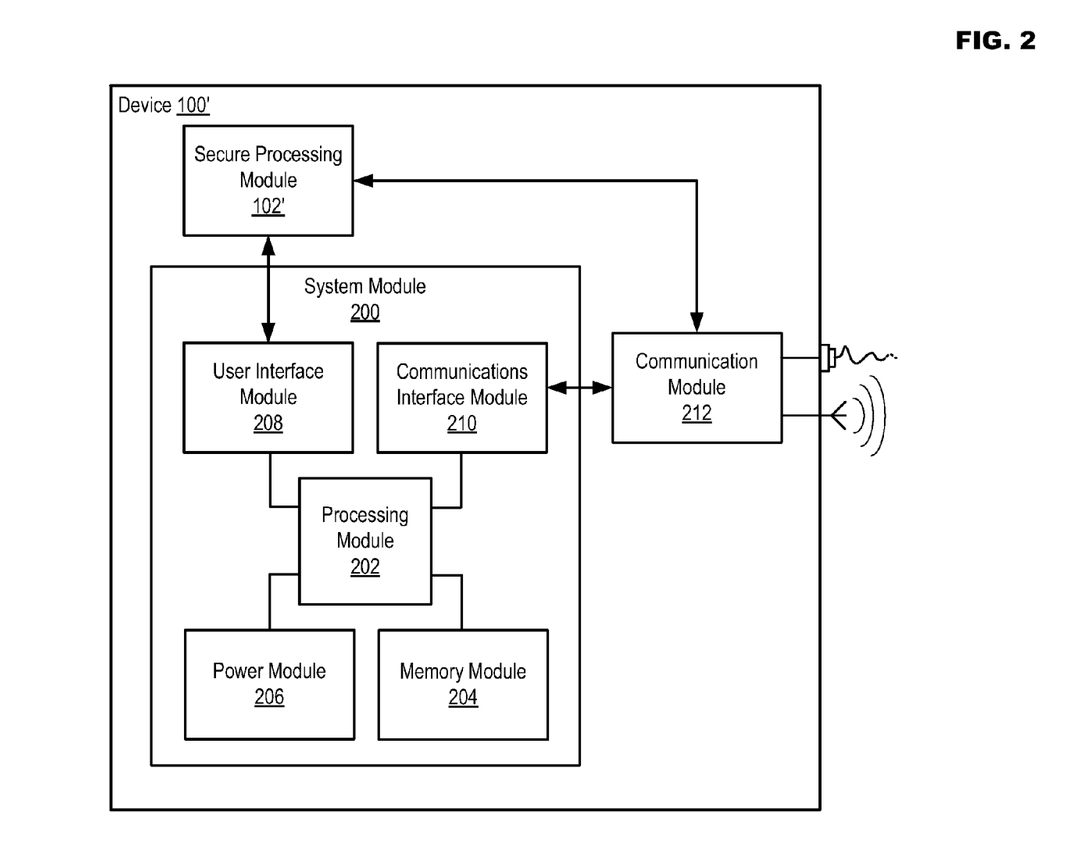
FIG. 2 illustrates an example configuration for a device usable in accordance with at least one embodiment of the present disclosure.

FIG. 2 illustrates an example configuration for device 100' usable in accordance with at least one embodiment of the present disclosure. Device 100' presents an example of equipment that may be used to implement content protection key management as set forth in FIG. 1. While various embodiments consistent with the present disclosure may be implemented in this manner, these embodiments are not limited only to the example configuration disclosed in FIG. 2. Device 100' may comprise system module 200 to generally manage device operations. System module 200 may include, for example, processing module 202, memory module 204, power module 206, user interface module 208 and communication interface module 210 that may be configured to interact with communication module 212. Device 100' may also comprise secure processing module 102' configured to interact with at least user interface module 208 and communication module 212. While communication module 212 and secure processing module 102' are shown as separate from system module 200, this is merely for the sake of explanation herein. Some or all of the functionality associated with communication module 212 and/or secure processing module 102' may also be incorporated within system module 200.

In device 102', processing module 202 may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium, Xeon, Itanium, Celeron, Atom, Core i-series product families. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Some or all of the functionality commonly associated with the support circuitry may also be included in the same physical package as the processor (e.g., an SOC package like the Sandy Bridge integrated circuit available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 100' such as, for example, static RAM (SRAM) or Dynamic RAM (DRAM). ROM may include memories such as bios memory configured to provide instructions when device 100' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 208 may include internal power sources (e.g., a battery) and/or external power sources (e.g., electromechanical or solar generator, power grid, etc.), and related circuitry configured to supply device 100' with the power needed to operate.

User interface module 208 may include circuitry configured to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

Secure processing module 102' may be implemented in device 100' as a distinct security processor separate from processing module 202 or may be part of processing module 202 (e.g., as a processor core dedicated to secure processing). Secure processing module 102' may be configured to communicate with user interface module 208 and/or communication module 212. For example, secure processing module may be configured to receive key information 120 via communication module 212 that may be decrypted into intermediate keys stored in intermediate key module 110. Key information 120 may be received from, for example, a content provider, a content protection provider, a licensing server, etc. Secure processing module 102' may employ any key information received through communication module 212 in deriving keys for use in decrypting encrypted content that may be presented (e.g., displayed or played back) via user interface module 208. For example, audio information may be presented via a speaker in the user interface module 208, video or textual information may be presented on a display in user interface module 208, etc.

Figure 3:
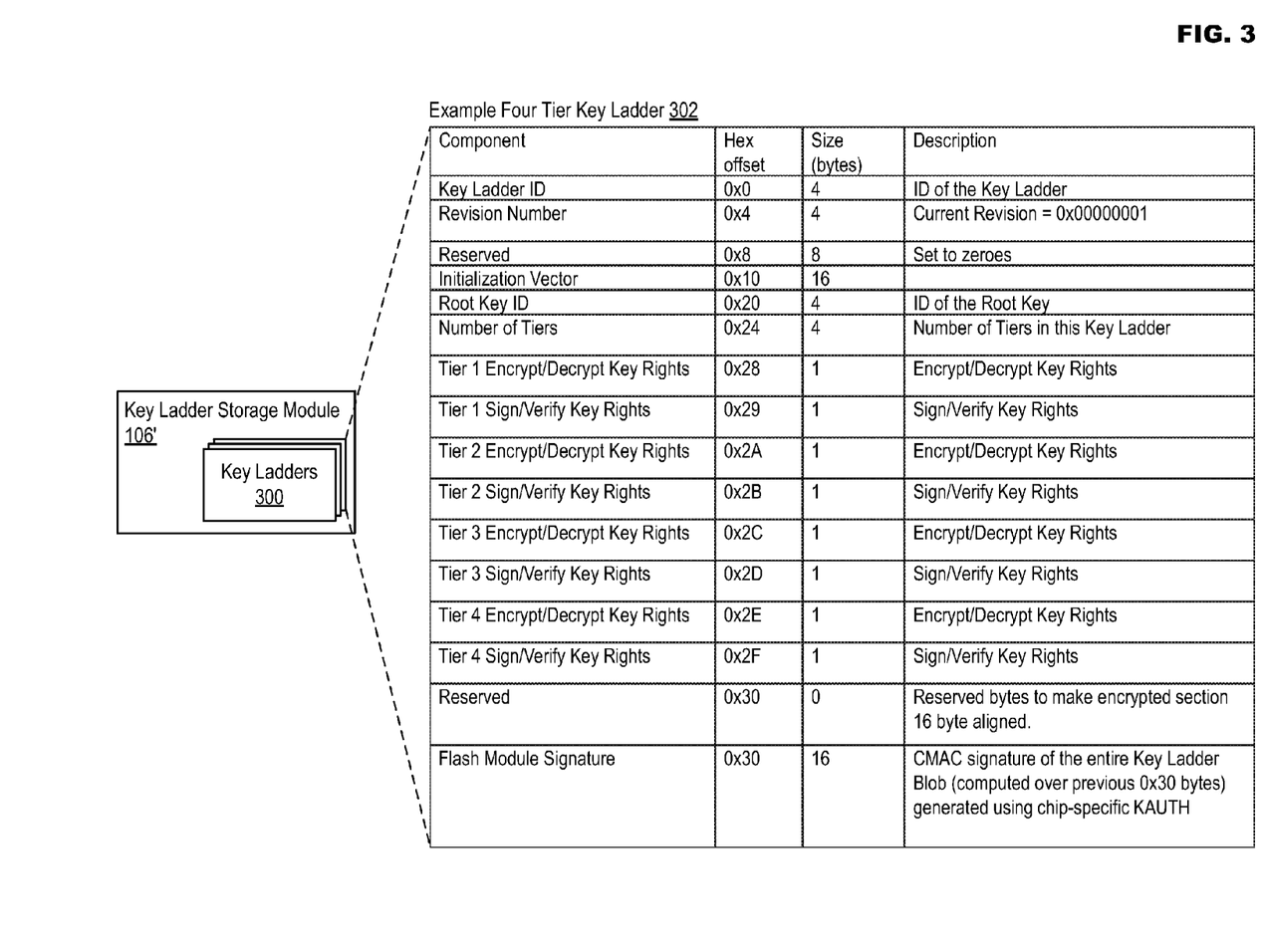
FIG. 3 illustrates an example configuration for a key ladder in accordance with at least one embodiment of the present disclosure.

FIG. 3 illustrates an example configuration 302 for key ladder 300 in accordance with at least one embodiment of the present disclosure. Key ladder storage module 106' may comprise multiple key ladders 300. In one embodiment, key ladders 300 may be protected from being modified by unauthorized processes by being loaded into firmware at the time of manufacture, and may be loaded into secure processing module 102 in a trusted manner (e.g., during a trusted boot process). Key ladders 300 may include all information needed to derive keys including, for example, the identification of required intermediate keys, intermediate key usage policies, etc. The required intermediate key information may be organized in one or more tiers. An example of a four-tier key ladder is illustrated in FIG. 3 at 302. Example key ladder 302 may include a key ladder ID and revision number so that it may be distinguished from other key ladders stored in key ladder storage module 106 and/or older revisions of the same key ladder. Example key ladder 302 may further comprise an initialization vector and root key ID specifying the root key for use in verifying and/or deriving other intermediate keys (e.g., intermediate session keys, etc.)

Example key ladder 302 may further specify a number of tiers. Each tier of example key ladder 302 has an entry specifying the properties for a specific key. In the example disclosed at 302, each tier may specify encrypt/decrypt key rights and/or sign/verify key rights for the key at that level. For instance, a key at tier 1 for example ladder 302 may only be able to decrypt a key into a level 2 using RSA version 1.1, the tier 3 key may only be used to decrypt data using AES, etc. Additional key tier properties may establish how an incoming key may be formatted. Those properties may include, for example, ASN.1, PKCS8, raw (e.g., with no formatting) or other customized formatting schemes. Example key ladder 302 may further comprise a flash module signature such as, for example, a cryptographic message authentication code (CMAC) signature allowing the contents of example key ladder 302 to be authenticated by comparing the CMAC to a value of a prior known-good version (e.g., using chip-specific kernel authorization (KAUTH)).

Figure 4:
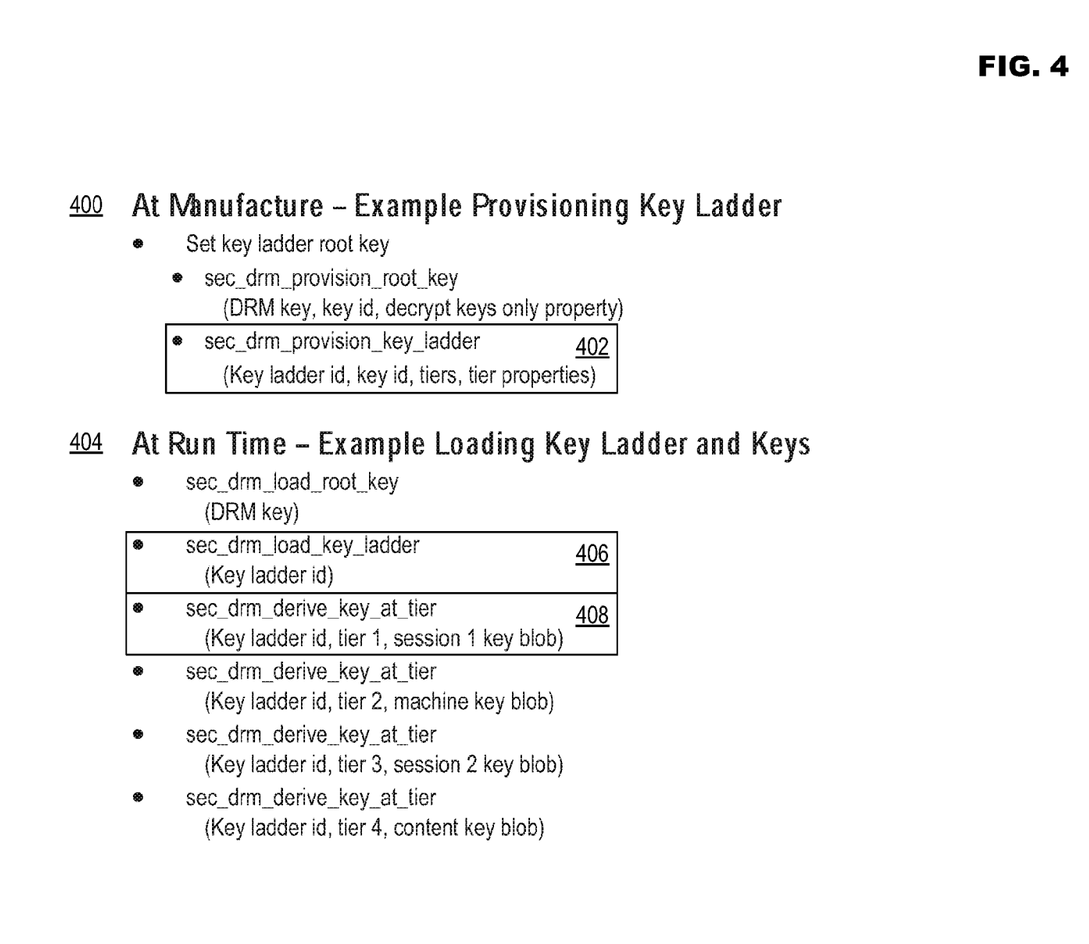
FIG. 4 illustrates example program code associated with key ladder installation and key derivation in accordance with at least one embodiment of the present disclosure.

FIG. 4 illustrates example program code associated with key ladder installation and key derivation in accordance with at least one embodiment of the present disclosure. For example, program code for provisioning key ladders 300 during manufacture are disclosed at 400, while program code for loading key ladders and keys are disclosed at 404. Some of the example code disclosed in FIG. 4 may be associated with existing content protection systems (e.g., Widevine, Adobe Access, Marlin, etc.), while example proposed code is highlighted at 402, 406 and 408.

For example, at 402 a command "sec_drm_provision_key_ladder" may be executed to provision key ladder 300 to device 100 (e.g., device 200) at manufacture. Information that may be needed to derive new key ladder 300 may include a key ladder identification (id), key id(s), tiers, tier properties, etc. The result of example code 402 may be to create a new key ladder 300 in device 200. During runtime (as illustrated in the coding example commencing at 404), the command "sec_drm_load_key_ladder" may be issued, as shown at 406, to load key ladder 300 into secure processing module 102 in device 200. Key ladder 300 may be loaded based on a key ladder id. Moreover, the key (e.g., intermediate key) corresponding to each tier in key ladder 300 may be loaded using the command "sec_drm_derive_key_at_tier" as shown at 408. Each intermediate key needed for deriving a content key corresponding to key ladder 300 may be identified (e.g., session 1 intermediate key) in each tier (e.g., tier 1) of key ladder 300 (e.g., key ladder id). While four "sec_drm_derive_key_at_tier" commands are illustrated in example 404, more or less tier commands may be issued depending on, for example, the particular content key.

Figure 5:
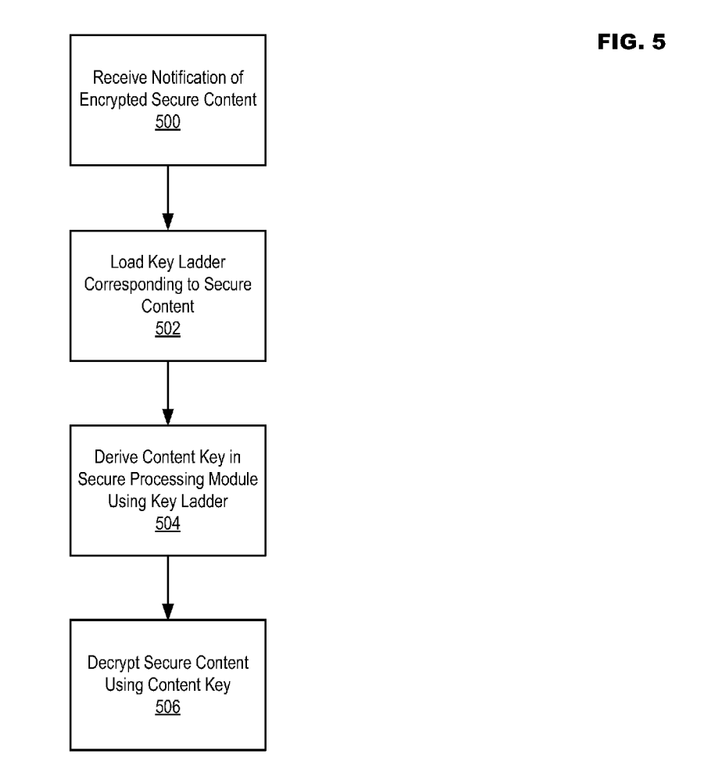
FIG. 5 illustrates example operations for content protection key management in accordance with at least one embodiment of the present disclosure.

FIG. 5 illustrates example operations for content protection key management in accordance with at least one embodiment of the present disclosure. In operation 500, notification may be received regarding encrypted secure content. For example, an attempt may be made to open encrypted secure content stored within a device, or alternatively, encrypted secure content may be received in a device from physical media, from the Internet, from a television signal, etc. In operation 502, a key ladder may be loaded in the device corresponding to the encrypted secure content (e.g., corresponding to the content key required to decrypt the encrypted secure content). The key ladder may specify at least one intermediate key required to derive the content key and may include, for example, identification of the at least one intermediate key and usage properties corresponding to the at least one intermediate key. In one embodiment, a key ladder may specify multiple intermediate keys in tiers, and each tier may identify properties corresponding to each intermediate key in each tier. A content key may then be derived using the key ladder in operation 504. The key ladder may act as a recipe for obtaining needed intermediate keys and deriving any temporary key information (e.g., session and intermediate keys) needed to decrypt the encrypted secure content. The content key may then be utilized to decrypt the encrypted secure information in operation 506 (e.g., for presentation on the device).

While FIG. 5 illustrates various operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to content protection key management. In general, devices may include secure processing resources configured to derive content keys (e.g., for use in decrypting secure content) using key ladders. In one embodiment, a device may comprise, for example, at least a secure processing module to derive content keys for use in decrypting secure content. The secure processing module may include, for example, a key ladder storage module and a secure key storage module. The key ladder storage module may be to store at least one key ladder for use in deriving at least one content key. The secure key storage module may be to store the at least one content key derived using the key ladder.

The following examples pertain to further embodiments. In one example there is provided a device. The device may include a secure processing module to derive content keys for use in decrypting secure content, the secure processing module including at least a key ladder storage module to store at least one key ladder for use in deriving at least one content key, and a secure key storage module to store the at least one content key.

The above example device may further comprise a content key derivation module to derive the at least one content key using at least one intermediate key identified by the at least one key ladder. In this configuration the example device may further comprise an intermediate key module configured to provide the at least one intermediate to the content key derivation module. In this configuration the example device may further comprise a general licensing module to request derivation of a content key from the key derivation module based on the secure content. In this configuration the example device may be further configured, wherein the at least one key ladder comprises at least one property corresponding to the at least one intermediate key. In this configuration the example device may be further configured, wherein the at least one property describes rights for the at least one intermediate key, the rights including at least one of encrypt/decrypt rights or sign/verify rights. In this configuration the example device may be further configured, wherein the at least one key ladder comprises tiers identifying each intermediate key needed to derive the at least one content key, each of the tiers including at least one property corresponding to the intermediate key identified in the tier. In this configuration the example device may be further configured, wherein the at least one key ladder further comprises an identification of a root key and an indication of a number of tiers in the at least one key ladder.

The above example device may be further configured, alone or in combination with the above further configurations, wherein the at least one key ladder is encoded in firmware within the device when the device is manufactured.

In another example there is provided a method. The method may include receiving notification of encrypted secure content in a device, loading a key ladder into a secure processing module in the device in response to the notification, deriving a content key in the secure processing module using the key ladder, and decrypting the encrypted secure content in the secure processing module using the content key.

The above example method may be further configured, wherein the key ladder identifies at least one intermediate key for use in deriving the content key. In this configuration the example method may be further configured, wherein the key ladder comprises tiers identifying each intermediate key needed to derive the content key, each tier including at least one property corresponding to the intermediate key identified in the tier. In this configuration the example method may be further configured, wherein deriving the content key comprises using the intermediate keys identified by the tiers of the key ladder to derive the content key. In this configuration the example method may be further configured, wherein the at least one property describes rights for each intermediate key, the rights including at least one of encrypt/decrypt rights or sign/verify rights.

The above example method may further comprise storing at least one key ladder in the device when the device is manufactured.

In another example there is provided a system comprising a device including at least a secure processing module, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured for content protection key management arranged to perform any of the above example methods.

In another example there is provided a device having means to perform any of the above example methods.

In another example there is provided at least one machine-readable storage medium having stored thereon individually or in combination, instructions that when executed by one or more processors result in the system carrying out any of the above example methods.

In another example there is provided a device. The device may include a secure processing module to derive content keys for use in decrypting secure content, the secure processing module including at least a key ladder storage module to store at least one key ladder for use in deriving at least one content key, and a secure key storage module to store the at least one content key.

The above example device may further comprise a content key derivation module to derive the at least one content key using at least one intermediate key identified by the at least one key ladder, the at least one intermediate key being provided to the content key derivation module by an intermediate key module in the device. In this configuration the example device may further comprise a general licensing module to request derivation of a content key from the key derivation module based on the secure content. In this configuration the example device may be further configured, wherein the at least one key ladder comprises at least one property corresponding to the at least one intermediate key. In this configuration the example device may be further configured, wherein the at least one property describes rights for the at least one intermediate key, the rights including at least one of encrypt/decrypt rights or sign/verify rights. In this configuration the example device may be further configured, wherein the at least one key ladder comprises tiers identifying each intermediate key needed to derive the at least one content key, each of the tiers including at least one property corresponding to the intermediate key identified in the tier.

The above example device may be further configured, alone or in combination with the above example configurations, wherein the at least one key ladder is encoded in firmware within the device when the device is manufactured.

In another example there is provided a method. The method may include receiving notification of encrypted secure content in a device, loading a key ladder into a secure processing module in the device in response to the notification, deriving a content key in the secure processing module using the key ladder, and decrypting the encrypted secure content in the secure processing module using the content key.

The above example method may be further configured, wherein the key ladder identifies at least one intermediate key for use in deriving the content key. In this configuration the example method may be further configured, wherein the key ladder comprises tiers identifying each intermediate key needed to derive the content key, each tier including at least one property corresponding to the intermediate key identified in the tier. In this configuration the example method may be further configured, wherein deriving the content key comprises using the intermediate keys identified by the tiers of the key ladder to derive the content key.

The above example method may further comprise, alone or in combination with the above example configurations, storing at least one key ladder in the device when the device is manufactured.

In another example there is provided a system comprising a device including at least a secure processing module, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry any of the above example methods.

In another example there is provided a device. The device may include a secure processing module to derive content keys for use in decrypting secure content, the secure processing module including at least a key ladder storage module to store at least one key ladder for use in deriving at least one content key, and a secure key storage module to store the at least one content key.

The above example device may further comprise a content key derivation module to derive the at least one content key using at least one intermediate key identified by the at least one key ladder. In this configuration the example device may further comprise an intermediate key module configured to provide the at least one intermediate to the content key derivation module. In this configuration the example device may further comprise a general licensing module to request derivation of a content key from the key derivation module based on the secure content. In this configuration the example device may be further configured, wherein the at least one key ladder comprises at least one property corresponding to the at least one intermediate key. In this configuration the example device may be further configured, wherein the at least one property describes rights for the at least one intermediate key, the rights including at least one of encrypt/decrypt rights or sign/verify rights. In this configuration the example device may be further configured, wherein the at least one key ladder comprises tiers identifying each intermediate key needed to derive the at least one content key, each of the tiers including at least one property corresponding to the intermediate key identified in the tier. In this configuration the example device may be further configured, wherein the at least one key ladder further comprises an identification of a root key and an indication of a number of tiers in the at least one key ladder.

The above example device may be further configured, alone or in combination with the above further configurations, wherein the at least one key ladder is encoded in firmware within the device when the device is manufactured.

In another example there is provided a method. The method may include receiving notification of encrypted secure content in a device, loading a key ladder into a secure processing module in the device in response to the notification, deriving a content key in the secure processing module using the key ladder, and decrypting the encrypted secure content in the secure processing module using the content key.

The above example method may be further configured, wherein the key ladder identifies at least one intermediate key for use in deriving the content key. In this configuration the example method may be further configured, wherein the key ladder comprises tiers identifying each intermediate key needed to derive the content key, each tier including at least one property corresponding to the intermediate key identified in the tier. In this configuration the example method may be further configured, wherein deriving the content key comprises using the intermediate keys identified by the tiers of the key ladder to derive the content key. In this configuration the example method may be further configured, wherein the at least one property describes rights for each intermediate key, the rights including at least one of encrypt/decrypt rights or sign/verify rights.

The above example method may further comprise storing at least one key ladder in the device when the device is manufactured.

In another example there is provided a system. The system may include means for receiving notification of encrypted secure content in a device, means for loading a key ladder into a secure processing module in the device in response to the notification, means for deriving a content key in the secure processing module using the key ladder, and means for decrypting the encrypted secure content in the secure processing module using the content key.

The above example system may be further configured, wherein the key ladder identifies at least one intermediate key for use in deriving the content key. In this configuration the example system may be further configured, wherein the key ladder comprises tiers identifying each intermediate key needed to derive the content key, each tier including at least one property corresponding to the intermediate key identified in the tier. In this configuration the example system may be further configured, wherein deriving the content key comprises using the intermediate keys identified by the tiers of the key ladder to derive the content key. In this configuration the example system may be further configured, wherein the at least one property describes rights for each intermediate key, the rights including at least one of encrypt/decrypt rights or sign/verify rights.

The above example system may further comprise, alone or in combination with the above further configurations, means for storing at least one key ladder in the device when the device is manufactured.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
    a secure processing module to derive content keys for use in decrypting secure content, the secure processing module including at least:
        a key ladder storage module to store at least one key ladder including a data structure identifying at least one intermediate key for use in deriving at least one content key;
        a secure key storage module to store the at least one content key; and
        a content key derivation module to derive the at least one content key using the at least one intermediate key identified by the at least one key ladder;
    wherein the at least one key ladder comprises at least one property corresponding to the at least one intermediate key, the at least one property describing rights for the at least one intermediate key, the rights including at least one of encrypt/decrypt rights or sign/verify rights.

2. The device of claim 1, further comprising an intermediate key module configured to provide the at least one intermediate key to the content key derivation module.

3. The device of claim 1, further comprising a general licensing module to request derivation of a content key from the key derivation module based on the secure content.

4. The device of claim 1, wherein the at least one key ladder comprises tiers identifying each intermediate key needed to derive the at least one content key, each of the tiers including at least one property corresponding to the intermediate key identified in the tier.

5. The device of claim 4, wherein the at least one key ladder further comprises an identification of a root key and an indication of a number of tiers in the at least one key ladder.

6. The device of claim 1, wherein the at least one key ladder is encoded in firmware within the device when the device is manufactured.

7. A method, comprising:
    receiving notification of encrypted secure content in a device;
    loading a key ladder including a data structure identifying at least one intermediate key into a secure processing module in the device in response to the notification;
    deriving a content key in the secure processing module using the at least one intermediate key identified by the key ladder; and
    decrypting the encrypted secure content in the secure processing module using the content key;
    wherein the at least one key ladder comprises at least one property corresponding to the at least one intermediate key, the at least one property describing rights for the at least one intermediate key, the rights including at least one of encrypt/decrypt rights or sign/verify rights.

8. The method of claim 7, wherein the key ladder comprises tiers identifying each intermediate key needed to derive the content key, each tier including at least one property corresponding to the intermediate key identified in the tier.

9. The method of claim 8, wherein the at least one property describes rights for each intermediate key, the rights including at least one of encrypt/decrypt rights or sign/verify rights.

10. The method of claim 7, further comprising storing at least one key ladder in the device when the device is manufactured.

11. At least one non-transitory machine-readable storage medium having stored thereon, individually or in combination, instructions that when executed by one or more processors result in the following operations comprising:
- receiving notification of encrypted secure content in a device;
- loading a key ladder including a data structure identifying at least one intermediate key into a secure processing module in the device in response to the notification;
- deriving a content key in the secure processing module using the at least one intermediate key identified by the key ladder; and
- decrypting the encrypted secure content in the secure processing module using the content key;
- wherein the at least one key ladder comprises at least one property corresponding to the at least one intermediate key, the at least one property describing rights for the at least one intermediate key, the rights including at least one of encrypt/decrypt rights or sign/verify rights.

12. The medium of claim 11, wherein the key ladder comprises tiers identifying each intermediate key needed to derive the content key, each tier including at least one property corresponding to the intermediate key identified in the tier.

13. The medium of claim 11, further comprising storing at least one key ladder in the device when the device is manufactured.

* * * * *